Patented Apr. 15, 1941

2,238,540

UNITED STATES PATENT OFFICE 2,238,540

ART OF PREPARING CEMENT PRODUCTS

James A. Sourwine, Washington, D. C.

No Drawing. Application July 3, 1940,
Serial No. 343,900

20 Claims. (Cl. 106—24)

This application is a continuation in part of my co-pending application, Serial Number 285,017, filed July 17, 1939. My invention has for its purpose the making of improved types of cement products by using as an indurant a non-aqueous organic indurating liquid having a lower liquid surface tension than water and a lower freezing point than water, and of obtaining by this means useful cement products of superior quality.

My invention consists of combining with dry powdered cement (Portland cement, commercial and natural or modifications of same, or Lumnite cement, all as commonly used in building and construction work) a non-aqueous organic indurating liquid having a lower liquid surface tension than water and a lower freezing point than water, resulting in the forming of a hard firm cement matrix, and of combining with this cement matrix before setting, a dry aggregate consisting of mineral or other filler material, to form new and useful cement products.

The term "non-aqueous liquid" as used throughout this specification and in the attached claims, is herewith defined to consist of a liquid containing no water in excess of one per cent by weight, except water in such combined or semi-combined form that it cannot be separated from the basic liquid by the ordinary process of distillation or refining. The term "indurating liquid" is defined to consist of a liquid which reacts upon dry powdered cement to form a hard durable mass.

In the manufacture of the new cement products, various non-aqueous indurating liquids may be used. As illustrative examples, liquids which I have found to give good results as non-aqueous organic indurating liquids are in part as follows:

(A) Mixtures of toluol (toluene) with methyl alcohol.

(B) Mixtures of toluol (toluene) with blends of ethyl alcohol and methyl alcohol.

(C) The liquid toluol (toluene).

(D) Blends of methyl alcohol and ethyl alcohol.

(E) Capryl alcohol.

Some further informative description of my illustrative examples of indurating liquids may be of value. In general, for classes A, B and D, as listed above, from a wide variety of proportionate mixes, satisfactory induration has been obtained. For class A, toluol content ranging from twenty per cent to fifty per cent by volume seems to be particularly satisfactory. Mixtures containing one-third toluol by volume and containing two-fifths toluol by volume have been found very effective. For class D, methyl alcohol content ranging from twelve per cent to twenty-five per cent by volume as against ethyl alcohol ranging from eighty-eight per cent to seventy-five per cent by volume, make particularly satisfactory alcohol blends. Among the various proportionate additions of toluol to alcohol blend, as used in class B, I have found a mixture of one part toluol by volume, to four parts alcohol blend by volume, forms a very effective indurating liquid. The aggregate materials which may be added to form the required cement product, include sand and other sound earthen material, gravel and rock screenings, slag, broken rock and other mineral material, cotton fibre, mineral fibre, metal dust and filings, specially treated sawdust, manufactured material, and other aggregates as now known and commonly used in the making of water-mix cement products. Finished cement products may include cement plaster, cement block, cement brick, cement stucco, cement concrete, cement pipe, and other cement products. The cement products may be used for any construction purpose, but are particularly suitable where construction during cold weather is required, and where low water permeability and low water absorption are desired. They are also particularly suitable where resistance to deterioration through freezing is required, or resistance to deterioration caused by excessive volume change due to widely varying moisture content or to temperature variation within the body of the material.

As one useful curing process, I have developed a method which I have designated as the "double towel cure." I wet one towel consisting of one or more thicknesses of burlap or other cloth material, with the indurating liquid or with a modification or dilution of same with another anhydrous organic liquid, applying this as an inner towel directly to the surface or surfaces of the specimen. I wet a second similar towel with water, and apply this second towel around the inner-towel-wrapped specimen. At intervals I uncover the outer towel and re-wet the inner towel with the indurating liquid or with a modification or dilution of same with another anhydrous organic liquid, then rewet the outer towel with water, and replace the outer water towel over the surface of or around the inner-towel-covered specimen.

As a modified method of double towel cure, I wet the inner towel with the indurating liquid or a dilution of same by another anhydrous organic liquid, and I wet the outer towel with a liquid not readily miscible with or soluble in the indurating liquid. Glycerine is one of the liquids other than water and not soluble in toluol, which I have found effective for such use.

As another curing process, I devised a method for laboratory use, which achieved a condition of "periodic surface wetting" with my indurating liquid or a dilution of same by another anhydrous organic liquid. To achieve this "periodic surface wetting" for small specimens in laboratory, I make repeated successive applications at periodic intervals to the surface of my cement product specimen, of a damp towel or cloth which I had previously wetted with my anhydrous indurating liquid or a dilution thereof. On each application, I permitted the wetted towel to rest for a brief absorption period on the surface of my cement product specimen, until the surface of the specimen had absorbed the greater part of the indurating liquid contained in the towel, following which I removed the towel and exposed the surface of specimen to the air. This laboratory device of "periodic surface wetting" was designed to approximate for small specimens in laboratory the conditions of "periodic surface wetting" by spraying or sprinkling or otherwise, as might be done under actual conditions in construction work.

Other new methods of curing, all designed to restrain or replace the loss through evaporation of the indurating liquid, may be devised and used, without changing the process as herein outlined and described, and without altering the general characteristics of the cement product. In general, a lengthening of the period of cure, under any of the new curing processes, produces a harder and more durable cement product. The details of application of cure, for any of the curing processes as described in this specification, are illustrative and informative only, and are not intended as limiting or exclusive.

As guiding procedure for mixing and curing, I find in general that for making laboratory specimens of neat cement matrix, a satisfactory mixing time appears to vary from two to twenty minutes. In one instance, for demonstration purposes, and using a wet mix, I extended the mixing time to fifty minutes, with good results. On other occasions, by using a very dry mix, the mixing time was reduced to less than two minutes. The development of new and special equipment for mixing should shorten further the mixing time required. More detailed description of guiding procedure follows, found useful by me, in my laboratory tests. I used commonly the familiar practice of pouring the cement first into the mixing pan, then making a little hollow or depression in the center of the top surface of powdered cement, and pouring the indurating liquid into this depression. As a routine procedure, I kept turning in the dry powdered cement from around the edges, into the wet crater in the center, using a tablespoon or small trowel for the so doing. When the liquid had pretty well spread, and appeared to have obtained a reasonably even distribution through the matrix, in numerous cases with dry powdered cement still remaining around the edges of the damp matrix, I began stirring and mixing, and kept this up till a well blended mixture appeared to be obtained, of cement and liquid. I then distributed the matrix from mixing pan to containers, using any one of several forms of simple mechanical devices to bring the top of the matrix to a desired even surface in the container, and this being done, I set the containers with their contents aside, exposed to the air. In the case of a rather dry mix, when settlement of the matrix in container did not obtain readily, I expedited by pressing down or tamping the surface with a wood, metal or other tamping or compressing device.

In the making of mortar specimens, I at first followed a procedure now frequently used in the making of laboratory specimens of water-cement mortar. I poured dry powdered cement into the mixing pan, added by indurating liquid and mixed to a smooth blend, added about one-third to one-half of my sand and mixed this with the water-cement mixture, then added the remainder of my sand, and completed the mix by continued stirring or mixing till a smooth blend was obtained. Under this procedure, I found a slightly longer mixing time was required, for the preperation of a mortar, than I had previously found necessary for the preparation of a neat cement matrix. In later tests, during the preparing of a dry mix mortar, I reversed the above procedure, adding my indurating liquid to my sand and stirring or mixing till a well blended mix was obtained. Then I added my dry powdered cement and stirred or mixed this with the wetted sand till a good blend and mix was achieved. I found this reversed procedure practicable and producing of a good mortar, and the required time for mixing of mortar by this method was reduced to less than that required for the mixing of a neat cement matrix. In other tests, I mixed my sand and cement dry, and added my indurating liquid to the dry mortar consisting of sand and cement, stirring and mixing the indurating liquid into the dry mortar. Under this variation of mixing procedure, satisfactory results were also obtained.

In preparing a neat cement matrix with non-aqueous organic indurating liquids, I found myself able to obtain a special type of product by making a very dry mix, and then after mixing to a smooth blend without any appearance of liquidity, tamping the matrix to a relatively firm mass, when suddenly under the process of pressure and vibration resulting from the tamping, I found the matrix showing fluid plasticity, at spots on the surface, and under continued tamping the entire matrix became fluid and plastic. On setting this matrix away, exposed to the air, it became indurated and hard. When I continued the tamping of the fluid mass, it gradually dried and hardened and a first set was obtained under tamping, and with continued exposure only to air, and without other curing process, a hardening of the matrix resulted, such that five or six hours after mixing I was able to inscribe on the surface with a pencil, without scratching the surface, and on continued exposure to air, a reasonably hard matrix was formed, without other curing process than air exposure. In still later tests, a "double towel cure" was applied to several successive specimens made as above described, and additional hardening and improvement of product was thus obtained. Other curing processes also gave additional hardening.

Another cement product included among those made by my new process, consists of an extremely dry mix mortar, in which the amount of liquid added is sufficiently low that the wetted mortar can be handled somewhat in the same manner as wetted sand, the wetted mortar retaining what may be described as a loose granular state, without balling into lumps, and without becoming either liquid or plastic, under ordinary handling. This wetted mortar I poured into my molds or forms just as I would pour sand, after which I pressed and/or tamped it until a stiff consistency of mass was attained, without visible evidence of liquidity on the surface, and without evidence of any plastic elasticity in the mass other than the necessary internal cohesion of particles which appeared to occur to such degree under the pressure and/or tamping, sufficient to hold the particles together, into one adhered mass. Exposure to "double towel cure" of the mass as above formed resulted in a firm durable cement mortar. The use of other curing procedures also resulted in a good product.

In the making of laboratory specimens, except for those of very dry mix, I found during my tests that a certain time of exposure of the upper surface to air cure, before the beginning of any other cure process, appeared to expedite the hardening. I found particularly in the making of neat cement briquettes, that a certain time of exposure of upper surface to air cure immediately after mixing and placement, to permit a certain amount of drying and the formation of a surface crust, before any other curing process was applied, appeared to result in a superior product. The best time of duration of this initial air curing process varied markedly for various matrixes and mortars, being modified both by the indurant used, and by the degree of wetness of mix. For a given indurant and a given wetness of mix, the best time of duration for initial air cure, appeared also to vary largely with the size or mass of the specimen being cured. For a small specimen of neat cement, and a medium wet mix, an initial air cure lasting from two to four hours gave good results. For larger specimens, with a medium wet mix, a considerably longer period of initial air cure appeared satisfactory. For dry mixes, and particularly for dry mix mortars, the relatively immediate application of a curing process other than an air cure, gave satisfactory results. In general, a wide range of wetness or dryness of mix gives satisfactory results, the dry mix requiring less care in curing, to produce satisfactory induration.

As a part of my laboratory work, and with the objective of developing minor improvements in my general process without changing the general procedure in same, I experimented with the mixing and compacting of various admixtures of Portland cement and Lumnite cement with varying proportionate amounts of anhydrous organic indurating liquid. My research developed possibilities of several minor modifications in resultant cement product, indicating possible further reduction of water absorption and of evaporation loss following exposure to water absorption. Also, as a part of my laboratory work, in making water absorption tests and tests of evaporation loss, for all various types of my cement products, as achieved by the use of an anhydrous organic indurating liquid, I found that following the completion of a primary cure treatment by one of the new curing processes as herein described, the use of a secondary or supplemental cure consisting of the exposure of the surface or surfaces of the new product to air cure or to water cure or successively to air cure and to water cure for a given period following the completion of primary cure, shows to have a certain additive curing value, and results in developing a still further improved cement product, having a very low water absorption and having a very low percentage of weight loss through evaporation when exposed to air, following completion of the secondary cure treatment. It is to be noted that the use of a secondary or supplemental cure treatment, following the completion of primary cure treatment, is merely a minor additive optional part of a general procedure, which general procedure is either complete in itself without the supplemental cure, or which may include as a part of itself the additive secondary or supplemental cure procedure. The details of description of supplemental cure procedure as hereabove given, are illustrative and informative only, and are not intended to be in any way limiting or exclusive as to the details of procedure.

To serve as practical illustrative examples and as a guide to persons not conversant with this new art of combining dry powdered cement with an anhydrous organic indurating liquid, and curing a specimen of matrix or mortar or other cement mixture thus made, to form a hard durable cement product, I include herewith the description of several laboratory tests made by me, which may serve as examples of laboratory procedure, following the procedure in which will enable any person to make for himself or herself a specimen of my new cement product.

The illustrative examples are selected examples, taken from laboratory work done during the past year and a half, as the result of which work I find available in my laboratory sample specimens which serve to illustrate some of the different modifications of cement matrix and cement mortar achieved by my new process. I describe six laboratory tests, four of which produce a cement matrix and two of which produce a cement mortar, all by the combining of cement with a non-aqueous organic indurating liquid. In order to avoid the introduction of modifications of cement product produced by several different specific indurating liquids, illustrative examples have been selected in which the same or a closely similar indurating liquid has been used. For all illustrative examples, except Example D, the same indurating liquid was used, being a mixed liquid consisting of one part toluol by volume blended with two parts methyl alcohol by volume. For Example D, no sample specimens made of the above toluol-alcohol blend being available, a sample is submitted which was made with liquid toluol. For the toluol-alcohol blend, being one part by volume of toluol with two parts by volume of methyl alcohol, I have used in my record of laboratory tests, and will use in my description of illustrative examples, as given in the specification, the designation "Alcotol A." As a further item of general information, for those seeking to reproduce certain of my illustrative test examples, it should be stated that lacking an effective tamping tool for my need, I have found it useful to devise one of convenient size, consisting of a cylindrical brass rod 1⅜" diameter and 8" long, sawed and filed to a smooth surface at each end, the end surface being cut at right angles to the lengthwise axis of the cylinder. This tamping tool is used by me in those of the below described illustrative tests, in which tamping is specified as required. No specific tamping tool is prescribed for use in the making of laboratory samples, but as a means of expediting work in laboratory a tamping tool of approximately the size and weight above described will be found useful. The descriptions of procedure for the several illustrative test examples, follow herewith.

*Illustrative Example A.*—To form a neat cement matrix by mixing dry powdered cement with a non-aqueous organic indurating liquid, and curing by restraining the evaporation of the indurating liquid from the cement mixture.

I measured out into a mixing pan two large jiggers of dry powdered Portland cement (Lehigh cement was used) and added one large jigger of the non-aqueous organic indurating liquid Alcotol A, mixing the wet mass for five minutes with a small glass stirring rod. Using a small trowel, I transferred to each of two composition drinking receptacles which I used as forms (size 2¾" depth and 1¾" bottom diameter was used), a sufficient quantity of wet cement mixture to fill the form to an even depth of approximately ⅝". I settled the wet mixture in each form to an even surface by jarring the bottom of the form four or five times against the mixing table, then left each specimen to dry, exposed to the air, for a period of six hours. At the end of the six-hour drying period, I covered the top surface of each specimen by inserting in each container another container of similar size, making an air-tight cover, with the outer bottom of the inner container fitting down within ⅛" to ¼" of the top surface of the wetted cement mixture. I let each specimen stand, with the evaporation of indurating liquid restrained by the air-tight cover as above described, for a period of eight days. At the end of the eight-day period of restrained evaporation, I removed the air-tight cover from the top surface of each specimen, and exposed the specimen to cure in air, for twenty days. At the age of twenty-eight days, I inspected exposed specimen, and found a hard firm cement matrix.

*Illustrative Example B.*—To form a neat cement matrix by combining through mixing and curing, dry powdered Portland cement with a non-aqueous organic indurating liquid.

I measured into a mixing pan two parts by volume (four large jiggers of cement were used) of dry powdered Portland cement (Lone Star cement was used for this test), and added one part by volume (two large jiggers of liquid were used) of the non-aqueous organic indurating liquid Alcotol A, mixing the wet cement mixture for five minutes with a glass stirring rod. Using a small trowel, I transferred to each of several glass forms (2¼" inside diameter glass ash trays ⅜" inside depth were used as forms), a sufficient quantity of wet cement mixture to fill the form to an even depth slightly below top. I settled the wet mixture in each form to an even surface by jarring the bottom of the form four or five times against the mixing table, then left each specimen to dry, exposed to the air, for a period of five hours. At the end of the five-hour drying period, I covered the top surface of each specimen with a "double towel cure," the towel sections being trimmed to fit the top surface of the form, the under towel wetted with Alcotol A resting on the top surface of the cement mixture and the upper towel wetted with water resting on top of the under towel wetted with Alcotol A, in such manner as to protect the wetted alcotol towel from evaporation by air. In wetting each towel for laboratory use, I took care to avoid the presence of excess free liquid in either towel, by slapping each towel a few times after wetting, against a hard flat surface to remove excess free liquid before using wetted towel as a cure towel. I let each cement specimen remain under "double towel cure" for fourteen days, renewing the wetting of cure towels at intervals as required, in such manner that they should continue wetted throughout the curing period. As wetting intervals for cure towels, I used six-hour intervals for first twenty-four-hour day, eight-hour intervals for second and third day, twelve-hour intervals for fourth and fifth day, sixteen-hour intervals for sixth and seventh day, and twenty-four-hour intervals from then to completion of curing period. At the end of fourteen days from time of beginning "double towel cure," I removed the cure towels, and exposed specimen to air cure for fourteen days. At the age of twenty-eight days, I inspected exposed specimen, and found a hard firm cement matrix.

*Illustrative Example C.*—To form a neat cement matrix by combining through mixing and compacting and curing, dry powdered Portland cement with a non-aqueous organic indurating liquid.

I measured into a mixing pan ten small jiggers of dry powdered cement (Lehigh cement was used). Making a depression in the center of the top surface of the cement in mixing pan, I added three small jiggers of my non-aqueous organic indurating liquid Alcotol A. After letting stand about one minute to permit the dry cement to absorb the greater portion of the indurating liquid, I began turning in with my mixing spoon the dry loose powdered cement from around the edges, into the liquid in the central depression, until the Alcotol A liquid had all become absorbed by the cement. I then mixed wetted cement and the remaining dry cement, continuing this mixing for three minutes after completion of liquid absorption, until an apparently smooth and even-colored blend was obtained. The cement matrix was now evenly dark in color, with a consistency and appearance resembling that of moistened fine ground sand, with no free water visible and without any fluidity or plasticity apparent under ordinary handling with mixing spoon or trowel. With part of this treated loose cement, I filled a small glass container a little less than full. For convenience in handling, I used a glass container having somewhat the shape of a truncated cone, with bottom diameter slightly smaller than top diameter. I found a 3" top diameter and 2" depth conveniently available, and used such a container here. I tamped my specimen two minutes with my brass tamp, until specimen was evenly compacted and top surface was fairly evenly smooth. Then from my piece of toweling, I trimmed out small sections to fit the top surface of my sample specimen, a double thickness of each of which small sections of towel cloth I have for convenience designated as a "towel." I used two towels, wetting the first towel with alcotol, and the second towel with water. I applied the alcotol towel directly on the top surface of the specimen, and the water towel on top of the alcotol towel. After wetting my towels, both my alcotol towel and my water towel, I slapped the wetted towel lightly a few times against a hard surface, sufficiently to assure myself that the liquid had spread evenly throughout the towel, until the entire towel had become wetted to about the limit of its capillary capacity. I let the treated and compressed cement matrix remain in the glass container for eight days, renewing the wetting of the top-surface cure towels at intervals during the period. I rewet the top-surface cure towels at six-hour intervals for the first twenty-four-hour day, at eight-hour intervals for the second and third day, at twelve-hour intervals for the fourth and fifth days, at sixteen-hour intervals for the sixth and seventh day, and at a twenty-four-hour interval for the eighth day. At the end of eight days from time of mixing, I renewed my specimen from alcotol cure and exposed it to air cure for a period of six days. At the age of fourteen days from completion of mixing, I inspected my exposed specimen and found a hard firm cement matrix. Following another fourteen days' air exposure, and with the specimen at the age of twenty-eight days, I ground all surfaces of specimen on a carborundum wheel to a smooth finished surface. Specimen with surfaces as thus finished was let stand exposed to air.

*Illustrative Example D.*—To form a neat cement matrix by combining through mixing and compacting and curing, dry powdered Lumnite cement with a non-aqueous organic indurating liquid.

I measured into a mixing pan five large jiggers of dry powdered Lumnite cement and added one large jigger of toluol (industrial grade). Mixing and tamping procedure was as in Illustrative Example C, except that I allowed one minute longer for absorption and for tamping, making a total absorption time of two minutes, a mixing time of three minutes, and a tamping time of three minutes. For container I used a cardboard drinking cup shaped as a truncated cone. I found such a cup, approximately 3" top diameter and 4" depth, handily available, and I used one here. In my tamping of this specimen, I rested the bottom of the cardboard container on a firm hard surface of compacted and hardened cement mortar, the top surface of which fitted smoothly against the bottom of my container, and offered a firmly resistant surface against my tamping. My procedure for curing was the same as for Illustrative Example C, and as a curing liquid, I used Alcotol A. I applied the cure immediately following the completion of the mixing and tamping. My time intervals for rewetting of cure towels were the same as for Example C. My total period of "double towel cure" was eight days, and this was followed by an air cure of six days. At the age of fourteen days from completion of mixing, I inspected my specimen and found a hard firm cement matrix. Following another fourteen days of air exposure, and with the specimen at the age of twenty-eight days, I ground all surfaces of specimen on a carborundum wheel to a smooth finished surface. Specimen with surfaces as thus finished, was let stand exposed to air. The above specimen was later cut into two half sections and one of these half sections constitutes the illustrative sample.

*Illustrative Example E.*—To form a cement mortar by combining through mixing and curing, dry powdered Portland cement and dry sand with a non-aqueous organic indurating liquid.

From my supply of Potomac River sand, I measured out twelve large jiggers into my mixing pan, and to this I added eight large jiggers of dry powdered Portland cement (Lehigh cement was used), stirring the dry mixture for five minutes, until a smooth appearing blend was obtained. I made a depression in the center of the top surface of dry mortar in mixing pan, and added four large jiggers of Alcotol A. I let stand two minutes for mortar to absorb free liquid, turning in the dry mortar meanwhile with my mixing spoon from around the edges, until all the mortar had become wetted with the indurating liquid. I continued the mixing of wetted mortar for a total period of six minutes, at end of which time a smooth appearing blend had been obtained. With this mixed wetted mortar I filled my containers. For containers I used a set of standard collapsible steel forms, each individual container being a cube 2"x2"x2". In filling each container, I first filled same about two-thirds full with wet mortar, following which I probed down into the mixture at each corner of container and around the edges with a glass stirring rod, so as to remove air bubbles and to permit the wetted mortar to settle smoothly against the edges and corners of the container. I then filled container slightly more than level full, and probed again a number of times with stirring rod down into the mixture, to remove air bubbles from same, and to obtain a smooth mixture throughout the mass. Then I struck off the top of specimens smoothly with a steel trowel, and let frame of mortar-filled containers stand exposed to air for two hours, following which I applied a top surface "double towel cure," the bottom cure towel being wetted with Alcotol A and the upper cover towel being wetted with water, applying cure towels over top surface of entire frame of mortar specimens. I let the frame of mortar specimens, covered by curing towels, stand thus for twenty-four hours, renewing the wetting of curing towels at twelve-hour intervals. At the end of twenty-four hours, I removed collapsible frame and took out carefully each mortar specimen. I placed the several mortar specimens in a row side by side on a flat-top, water-proof-surface table, with about ¾" space between adjoining cubes and covered the group of specimens with "double towel cure," wrapping the cure towels carefully around top and sides of group of cubes, using double thickness of towel for both alcotol cure towel and water cover towel. These mortar specimens I left under "double towel cure" for twenty-eight days. My intervals for rewetting of heavy cure towels were six hours interval for the first three days, eight hours interval for the second three days, twelve hours interval for the next eight days, and twenty-four hours interval from then on. At the end of twenty-eight days, I removed my cure towels, and exposed mortar specimens to air. Inspection of my mortar specimen at the age of twenty-eight days, being at the time of removal of specimen to air, showed specimen to be hard firm cement mortar.

*Illustrative Example F.*—To form a cement mortar by combining through mixing and compacting and curing, dry powdered Portland cement and dry sand with a non-aqueous organic indurating liquid.

From my supply of dry Potomac River sand, I measured out nine large jiggers into my mixing pan, and to this I added six large jiggers of dry powdered Portland cement (Lehigh cement was used). I stirred the dry mixture for four minutes, until a smooth appearing blend was obtained. I made a depression in the center of the top surface of dry mortar, and added two large jiggers of Alcotol A, letting mixture stand for approximately two minutes, turning in the dry mortar meanwhile with my mixing spoon from around the edges, until all the free liquid had been absorbed by the mortar. I continued the mixing of wetted mixture for four minutes longer, until a smooth appearing and even colored blend had been obtained. With this treated mortar, which had the appearance of and which handled somewhat like granular wetted sand, I filled each of several composition containers a little less than full. I used as container, a composition drinking receptacle in the shape of a truncated cone with a top diameter of about 2¼", a bottom diameter slightly smaller, and an approximate depth of 3". I tamped each specimen three minutes with my brass tamp, until specimen was evenly compacted and top surface was fairly evenly smooth. Then from my piece of toweling, I trimmed out sections to fit the top surface of my specimen, a double thickness of each of which sections of towel cloth I have, for convenience, designated as a "towel." For curing, I used two towels, wetting the first with alcotol and the second with water. I applied the alcotol towel directly on the top surface of the specimen, and the water towel on the alcotol towel. From here on, I followed the same curing procedure as described for Illustrative Example C. At the age of fourteen days from completion of mixing, and following the process of curing as above described, I inspected my exposed specimen and found same to be hard firm mortar.

The sample procedures described in the above examples are for illustration only in order that any persons who desire to familiarize themselves with the new product may actually make a specimen, and that sample specimens made by me may be available from which there may be observed some of the new product's characteristic physical properties. The various procedures under which the new neat matrix and new mortar and other cement products may be manufactured, are not in any way limited to the procedures as described in the illustrative examples, and the details of procedure there given are illustrative only and not in any way limiting or exclusive.

Describing briefly in part the physical change achieved by my new process, I fill the surface pores of the cement and of the sand and of other particles of aggregate, with a liquid other than water and having a lower liquid surface tension than water, and by such amount as I fill such pores and cover such surfaces with a film of a liquid other than water, I exclude the presence of water from the space thus occupied. By my combination of cement with a non-aqueous organic indurating liquid, I form a cement product relatively repellant to water, I obtain a smoother and finer texture in the finished product, and I produce a more closely bonded mass, possessing a lesser water content and a lower unit water absorption, and having a lesser permeability to water passing through the mass, than is obtainable with a water-mix product. By the use of a non-aqueous organic indurating liquid having a lower freezing point than water, I make possible the mixing and indurating of cement products during extremely cold weather and under low air temperatures at which mixing and indurating are not practicable for cement mortar or concrete or other cement products formed by the mixture and combination of cement and of water, and I increase the resistance of the cement product after setting and hardening, against deterioration by freezing, and against deterioration due to volume change caused by varying moisture content, and/or by varying temperature within the mass. In the making of various types of mortar in which sand is a constituent part, by using a non-aqueous organic liquid having a lower liquid surface tension than water, I avoid the excessive expansion of mortar on wetting caused by water when used as an indurant, and as a result I have less shrinkage and less warping and less deformation of surface on drying. By adding the application of pressure and/or of vibration, by tamping or rolling or other mechanical process, to a very dry mix of cement with my anhydrous organic indurating liquid, I develop an unusually dense matrix and dense mortar, which form after having set and hardened, a close grained product of superior quality. By the adding of external pressure to a relatively dry mix of my new product, I induce the spreading of the anhydrous liquid in very thin film form throughout the matrix or the mortar, and I develop a much closer film bond, with a lesser content of free liquid or of suspended liquid, and with a lesser weight of liquid per unit volume, than is feasible with a water-mix cement product. By this form of my general process, I supply also a new practicable method of procedure suitable for use in general building construction, in particular for the construction of floor slabs and paving slabs, and I obtain, after hardening, an unusually durable product, being a very dense material, and one of superior quality in its resistance to water permeation and to water absorption, and in resistance to volume change with changing temperature.

I claim:

1. A new cement product formed by combining through mixing and compacting and curing, dry powdered cement with a non-aqueous organic indurating liquid which as a generic group includes liquid aromatic hydrocarbons and liquid alcohols and mixtures of said liquids, to form a hard firm cement matrix.

2. A new cement product formed by combining through mixing and compacting and curing, dry powdered cement and a dry mineral aggregate with a non-aqueous organic indurating liquid which as a generic group includes liquid aromatic hydrocarbons and liquid alcohols and mixtures of said liquids, to form a hard firm mortar or concrete or other cement product.

3. A new cement product formed by combining through mixing and compacting and curing, dry powdered cement and a dry aggregate which shall be composed of any one of several filler materials including sand, gravel, rock screenings, broken rock and other natural mineral material, cotton fibre, mineral fibre, metal dust and filings, treated sawdust, manufactured material and other commonly used cement product aggregates, or a mixture of any two or more of said aggregate materials, with a non-aqueous organic indurating liquid which as a generic group includes liquid aromatic hydrocarbons and liquid alcohols and mixtures of said liquids, to form a hard firm mortar or concrete or other cement product.

4. A new cement product formed by combining through mixing and curing, dry powdered cement with a non-aqueous organic indurating liquid which as a generic group includes liquid aromatic hydrocarbons and liquid alcohols and mixtures of said liquids, to form a hard firm cement matrix.

5. A new cement product formed by combining through mixing and curing, dry powdered cement and a dry mineral aggregate with a non-aqueous organic indurating liquid which as a generic group includes liquid aromatic hydrocarbons and liquid alcohols and mixtures of said liquids, to form a hard firm mortar or concrete or other cement product.

6. A new cement product formed by combining through mixing and curing, dry powdered cement and a dry aggregate which shall be composed of any one of several filler materials including sand, gravel, rock screenings, broken rock and other natural mineral material, cotton fibre, mineral fibre, metal dust and filings, treated sawdust, manufactured material and other commonly used cement product aggregates, or a mixture of any two or more of said aggregate materials, with a non-aqueous organic indurating liquid which as a generic group includes liquid aromatic hydrocarbons and liquid alcohols and mixtures of said liquids, to form a hard firm mortar or concrete or other cement product.

7. A new cement product formed by combining dry powdered cement with a non-aqueous organic indurating liquid which as a generic group includes liquid aromatic hydrocarbons and liquid alcohols and mixtures of said liquids, to form a hard firm cement matrix.

8. A new cement product formed by combining dry powdered cement and a dry mineral aggregate with a non-aqueous organic indurating liquid which as a generic group includes liquid aromatic hydrocarbons and liquid alcohols and mixtures of said liquids, to form a hard firm mortar or concrete or other cement product.

9. A new cement product formed by combining dry powdered cement and a dry aggregate which shall be composed of any one of several filler materials including sand, gravel, rock screenings, broken rock and other natural mineral material, cotton fibre, mineral fibre, metal dust and filings, treated sawdust, manufactured material and other commonly used cement product aggregates, or a mixture of any two or more of said aggregate materials, with a non-aqueous organic indurating liquid which as a generic group includes liquid aromatic hydrocarbons and liquid alcohols and mixtures of said liquids, to form a hard firm mortar or concrete or other cement product.

10. A new cement product formed by combining through mixing and compacting and curing, dry powdered cement with the non-aqueous indurating liquid toluol, to form a hard firm cement matrix.

11. A new cement product formed by combining through mixing and compacting and curing, dry powdered cement and a dry aggregate of mineral or other filler material, with the non-aqueous indurating liquid toluol, to form a hard firm cement mortar.

12. A new cement product formed by combining through mixing and curing, dry powdered cement with the non-aqueous indurating liquid toluol, to form a hard firm cement matrix.

13. A new cement product formed by combining through mixing and curing, dry powdered cement and a dry aggregate of mineral or other filler material, with the non-aqueous indurating liquid toluol, to form a hard firm cement mortar.

14. A new cement product formed by combining dry powdered cement with the non-aqueous indurating liquid toluol, to form a hard firm cement matrix.

15. A new cement product formed by combining dry powdered cement and a dry mineral aggregate, with the non-aqueous indurating liquid toluol, to form a hard firm cement mortar or concrete or other cement product.

16. A new cement product formed by combining dry powdered cement and a dry aggregate which shall be composed of any one of several filler materials including sand, gravel, rock, screenings, broken rock and other natural mineral material, cotton fibre, mineral fibre, metal dust and filings, treated sawdust, manufactured material and other commonly used aggregates, or a mixture of any two or more of said aggregate materials, with the non-aqueous indurating liquid toluol, to form a hard firm mortar or concrete or other cement product.

17. The method of preparing a cement product by combining dry powdered cement and the required aggregate material if any, with a non-aqueous organic indurating liquid which as a generic group includes liquid aromatic hydrocarbons and liquid alcohols and mixtures of said liquids, the said method including a new curing and hardening procedure, which consists of the use of a "double towel cure," the towels being burlap or other cloth material the inner of which is kept wetted with one of the generic group of non-aqueous organic indurating liquid as above described, said inner towel being applied directly to the surface or surfaces of the specimen, and the outer of which is kept wetted with water, said outer towel being applied over and covering the inner-towel-wrapped specimen.

18. The method of preparing a cement product by combining dry powdered cement and the required aggregate material if any, with a non-aqueous organic indurating liquid which as a generic group includes liquid aromatic hydrocarbons and liquid alcohols and mixtures of said liquids, the said method including a new curing and hardening procedure, which consists of the use of a "modified double towel cure," the towels being burlap or other cloth material, the inner of which is kept wetted with a non-aqueous organic indurating liquid as above described, said inner towel being applied directly to the surface or surfaces of the specimen, and the outer towel of which is kept wetted with liquid glycerine, said outer towel being applied over and covering the inner-towel-wrapped specimen.

19. The method of preparing a cement product by combining dry powdered cement and the required aggregate material if any, with a non-aqueous organic indurating liquid which as a generic group includes liquid aromatic hydrocarbons and liquid alcohols and mixtures of said liquids, the said method including a new curing and hardening procedure, which consists of the application to the surface or surfaces of the cement product, of a double towel or double layer of burlap or other cloth material, the first or under layer of which being applied directly to the surface or surfaces of the specimen, is kept wetted with a non-aqueous organic indurating liquid as above described, and the second or outer cover layer of which is kept wetted with a liquid not readily miscible with or soluble in the non-aqueous organic indurating liquid with which the under towel is kept wetted.

20. The method of preparing a cement product by combining dry powdered cement and the required aggregate material if any, with a non-aqueous organic indurating liquid which as a generic group includes liquid aromatic hydrocarbons and liquid alcohols and mixtures of said liquids, the said method including a new curing and hardening process, which consists of the periodic wetting or sprinkling of the surface or surfaces of the cement product while it is in the process of induration, with a non-aqueous organic indurating liquid.

JAMES A. SOURWINE.